(12) United States Patent
Kim et al.

(10) Patent No.: US 8,147,335 B2
(45) Date of Patent: Apr. 3, 2012

(54) METHOD OF PROVIDING GOLF CONTENTS IN MOBILE TERMINAL

(75) Inventors: Ki Tae Kim, Gumi-si (KR); Jae Gon Son, Daegu Metropolitan (KR); Soon Jin Kim, Daegu Metropolitan (KR); Jong Myung Lee, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 833 days.

(21) Appl. No.: 12/032,191

(22) Filed: Feb. 15, 2008

(65) Prior Publication Data

US 2008/0254916 A1    Oct. 16, 2008

(30) Foreign Application Priority Data

Apr. 11, 2007   (KR) .......................... 10-2007-0035687

(51) Int. Cl.
*A63B 57/00* (2006.01)

(52) U.S. Cl. ........................................ 463/41; 473/407

(58) Field of Classification Search .............. 463/40–42; 473/407
See application file for complete search history.

(56) References Cited

U.S. PATENT DOCUMENTS

| | | | | |
|---|---|---|---|---|
| 5,095,430 | A * | 3/1992 | Bonito et al. | 700/92 |
| 5,245,537 | A * | 9/1993 | Barber | 473/403 |
| 5,507,485 | A * | 4/1996 | Fisher | 473/407 |
| 6,456,938 | B1 * | 9/2002 | Barnard | 701/213 |
| 7,118,498 | B2 * | 10/2006 | Meadows et al. | 473/407 |
| 7,121,962 | B2 * | 10/2006 | Reeves | 473/407 |
| 7,239,269 | B2 * | 7/2007 | Nozawa | 342/357.57 |
| 2003/0032492 | A1 * | 2/2003 | Frazier | 473/169 |
| 2004/0073325 | A1 * | 4/2004 | Reeves | 700/91 |
| 2007/0087866 | A1 * | 4/2007 | Meadows et al. | 473/409 |
| 2007/0129178 | A1 * | 6/2007 | Reeves | 473/407 |
| 2008/0058125 | A1 * | 3/2008 | Nguyen | 473/407 |
| 2008/0234073 | A1 * | 9/2008 | Berg et al. | 473/409 |

FOREIGN PATENT DOCUMENTS

| | | |
|---|---|---|
| KR | 1020050022035 | 3/2005 |
| KR | 1020060106321 | 10/2006 |

* cited by examiner

*Primary Examiner* — Masud Ahmed
(74) *Attorney, Agent, or Firm* — H.C. Park & Associates, PLC

(57) ABSTRACT

A method of providing golf contents in a mobile terminal is disclosed. The method includes calculating the current location of the mobile terminal and a cup distance, displaying hole information if the cup distance is greater than a first critical distance, displaying green information if the cup distance is less than or equal to the first critical distance and greater than a second critical distance, and displaying a score record screen if the cup distance is less than or equal to the second critical distance.

20 Claims, 18 Drawing Sheets

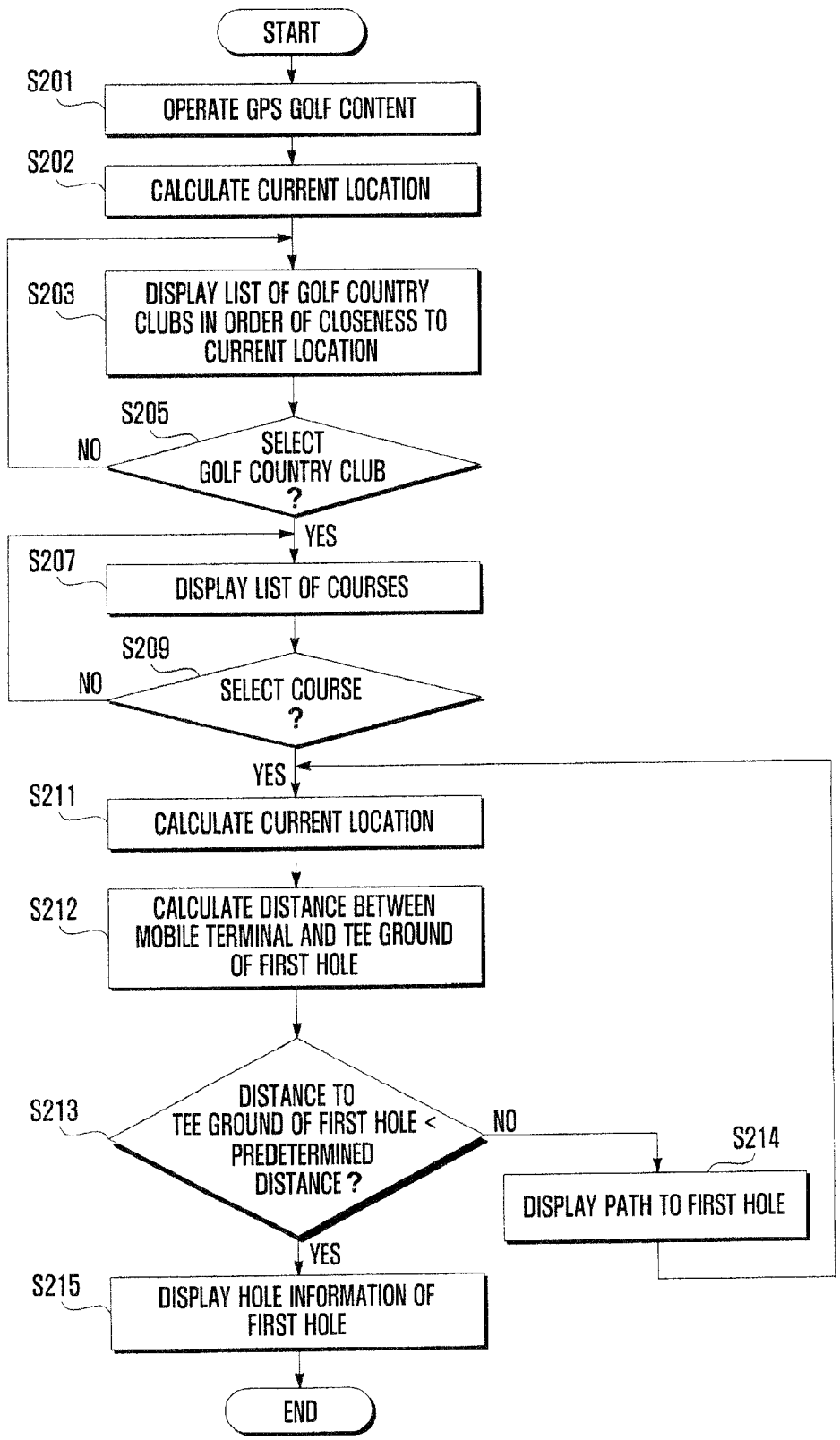

SCORE VIEW
GAPYUNG BENEST C.C

| 1970-01-05 00:45 |
| Pine Course |

| Hole | 1 | 2 | 3 | 4 | 5 | 6 | 7 | 8 | 9 |
|------|---|---|---|---|---|---|---|---|---|
| Par  | 4 | 4 | 3 | 4 | 4 | 4 | 3 | 4 | 5 |

◄ JOHN ►

| Score | 1 | 0 | -1 | 3 | 2 | 0 | 1 | -2 |  |

NUMERIC KEY 0~8 (*)-1 (#)-2 (9)-3

Member : 1    Total : 44 (+8)

CONFIRM

SCORE INFORMATION
GAPYUNG BENEST C.C

⚑ Pine

!
SCORE RECORDED.
CONFIRM 44 (+8)

PREVIOUS    MODIFY

METHOD OF PROVIDING GOLF CONTENTS IN MOBILE TERMINAL

CROSS REFERENCE TO RELATED APPLICATION

This application claims priority from and the benefit of Korean Patent Application No. 10-2007-0035687, filed on Apr. 11, 2007, which is hereby incorporated by reference for all purposes as if fully set forth herein.

BACKGROUND OF THE INVENTION

1. Field of the Invention

The present invention relates to a method of providing golf contents in a mobile terminal, and more particularly, to a method of automatically providing golf contents according to the current location of a mobile terminal having a global positioning system (GPS) function.

2. Discussion of the Background

The object of golf is to hit a golf ball from a tee area into a cup, which is located on a green, in the minimum number of strokes. Accordingly, a golfer may strategize by considering topographical information of a golf country club, such as the distance to the cup, the location of the rough, and the location of hazards.

To identify detailed distance information of a golf course, a golfer may rely on their own sense of distance or on the advice of a person experienced with the golf course. However, the distance information obtained by the above methods may be inaccurate.

SUMMARY OF THE INVENTION

The present invention provides automatic golf contents according to a location of a mobile terminal.

Additional features of the invention will be set forth in the description which follows, and in part will be apparent from the description, or may be learned by practice of the invention.

The present invention discloses a method of providing golf contents in a mobile terminal including calculating a current location of the mobile terminal and a current cup distance, displaying hole information if the current cup distance is greater than a first critical distance, displaying green information if the current cup distance is less than or equal to the first critical distance and greater than a second critical distance, and displaying a score record screen if the current cup distance is less than the second critical distance.

The present invention also discloses a method of providing golf contents in a mobile terminal, including displaying a list of golf country clubs in the order of closeness to a current location of the mobile terminal if operation of golf contents is requested, calculating the distance between the current location of the mobile terminal and a tee ground located at a first hole of a selected golf country club, displaying a path to the tee ground of the first hole if the calculated distance is greater than a first distance, displaying hole information of the first hole if the calculated distance is less than or equal to the first distance, calculating a cup distance defined as a distance between the current location of the mobile terminal and a cup of the first hole, displaying green information if the cup distance is less than or equal to a first critical distance and greater than a second critical distance, and displaying a score record screen if the cup distance is less than or equal to the second critical distance.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part this specification, illustrate embodiments of the invention, and together with the description serve to explain the principles of the invention.

FIG. 2 is a flow chart showing a process of operating GPS golf contents in a method of providing golf contents in a mobile terminal according to another exemplary embodiment of the present invention.

FIG. 7A, FIG. 7B, FIG. 7C, FIG. 7D, FIG. 7E, FIG. 7F, and FIG. 7G show display screen examples in the process of executing a function according to a key input of FIG. 6A and FIG. 6B.

DETAILED DESCRIPTION OF THE ILLUSTRATED EMBODIMENTS

Figure 1:
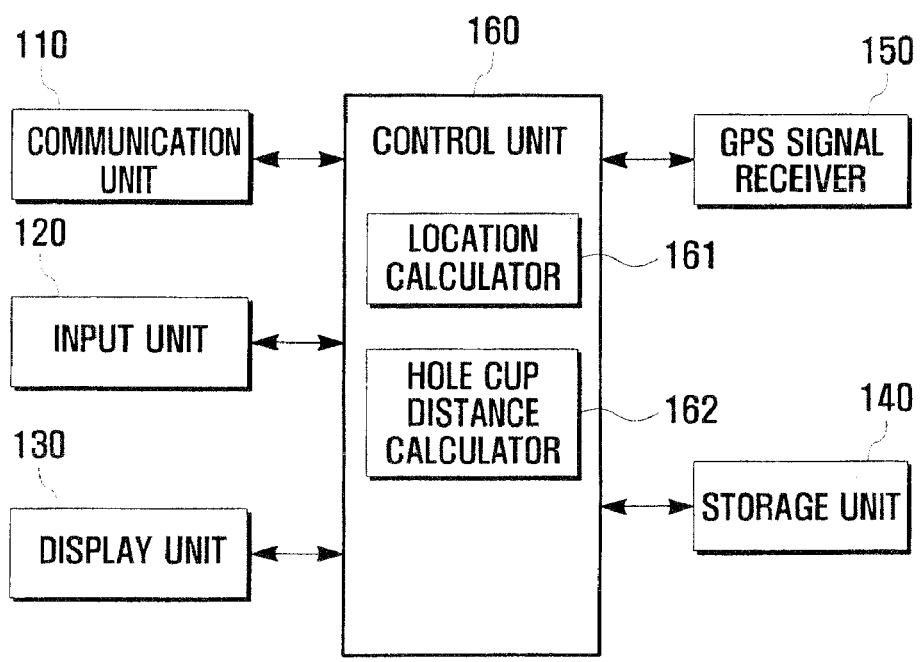
FIG. 1 is a block diagram showing a configuration of a mobile terminal for providing golf contents according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

In the present invention, "hole information" includes the current location of the mobile terminal, the current cup distance, the current hole distance, and the current green distance. The current location of the mobile terminal may be displayed with topographical information of the hole by matching with an image of a hole map. The "hole distance" is defined as the distance between a tee ground at which a first tee shot is executed after arriving at a hole, and a cup installed on a green into which a golf ball falls. The "cup distance" is defined as the distance between the current location of the mobile terminal and the cup. The "green distance" is defined as the distance between the current location of the mobile terminal and a boundary of the green or as the distance between the current location of the mobile terminal and the center point of the green.

If the cup distance is less than or equal to a first critical distance and greater than a second critical distance, an "automatic hole guide function" displays "green information" in a display unit by matching the current location of the mobile terminal with a location of the cup in an expanded screen that shows an image of topographical information of the green. That is, if the cup distance is less than or equal to a first critical distance and greater than the second critical distance, a control unit determines that the mobile terminal is currently located on the green, and controls the display unit to display the green information automatically. The first critical distance is defines as the distance between the cup and a boundary of the green. The first critical distance is preferably set such that a circular area having the first critical distance as a radius is included in the green.

If the cup distance is less than or equal to the second critical distance, the "automatic hole guide function" displays pre-stored information of a number of strokes corresponding to holes and to users, then automatically displays a "score record screen" in which a new number of strokes may be input for storage. That is, if the cup distance is less than or equal to the second critical distance, the control unit determines that the mobile terminal is located close to the cup, and automatically displays the "score record screen" such that the user may input the number of strokes. The second critical distance is preferably set within a range at which the user can typically hit the golf ball into the cup by one or two strokes of putting.

If, after displaying the score record screen, the cup distance is greater than the first critical distance, path and hole information of the next hole is displayed in the display unit. That is, after displaying the score record screen, if the cup distance is greater than the first critical distance, the control unit determines that the user of the mobile terminal has completed the hole and is moving to the next hole. Subsequently, the control unit controls the display unit to display a path to the next hole, and controls the display unit to display hole information of the next hole automatically when the mobile terminal arrives at the next hole.

In the present invention, a "course" means a place for playing golf, in which a plurality of holes are included. Generally, hole numbers 1, 2, 3, 4, 5, 6, 7, 8, and 9 are described as the "front nine" and hole numbers 10, 11, 12, 13, 14, 15, 16, 17, and 18 are described as the "back nine."

In exemplary embodiments of the present invention, a strategy for playing a hole is described according to topographical characteristics of the hole.

The "green" is divided into a left green and a right green, and a plurality of cups are included in each green. However, only one hole in each green is described for convenience. A change of left/right green means that the green is switched from the left green to the right green by the user's selection, and if the green changes, the cup changes accordingly.

A "drive distance" refers to the distance that a golf ball travels when impacted of a golf club.

A "detailed display of distance information" refers to the distances provided by GPS golf contents (for example, cup distance, hole distance, green distance, and drive distance) are displayed in a hole map by matching the distances with the hole map.

"Interruption of GPS signal reception" means that reception of a GPS signal is discontinued by an abnormal cause. The abnormal cause may include, for example, a shaded area of a GPS signal and a shutdown of electric power due to complete discharge of a battery or separation of the battery.

"Recovering GPS signal reception" means that a GPS signal is received again after the GPS signal is interrupted by an abnormal cause. Although, for convenience of explanation, exemplary embodiments of the present invention describe a method of calculating the current location of a mobile terminal by using a GPS signal received from GPS satellites, the present invention is not limited thereto.

FIG. 1 is a block diagram showing a configuration of a mobile terminal for providing golf contents according to an exemplary embodiment of the present invention.

Referring to FIG. 1, the mobile terminal includes a communication unit 110, an input unit 120, a display unit 130, a storage unit 140, a GPS signal receiver 150, and a control unit 160.

The communication unit 110 may be configured with a radio frequency (RF) transmitter to up-convert the frequency of a signal to be transmitted and amplify the signal, and an RF receiver to low noise amplify a received signal and down-convert the frequency of the signal.

The input unit 120 may include a touch pad or a keypad having alphanumeric keys, function keys, and special keys, and outputs a signal input by a user to control operation of the mobile terminal to the control unit 160.

The display unit 130 may include a liquid crystal display (LCD) and it displays various data generated by the mobile terminal and the current operation state of the mobile terminal. In particular, the display unit 130 displays hole information according to the current location of the mobile terminal under the control of the control unit 160.

The storage unit 140 stores programs and data required for general operation of the mobile terminal and operation of golf contents. In particular, the storage unit 140 stores golf country club information.

The golf country club information may include a name of a golf country club, location coordinates of the golf country club, a hole number, location coordinates of a tee ground, location coordinates of a cup, a strategy for playing a hole, and a hole map.

The storage unit 140 stores a set distance, a first critical distance, a second critical distance, and a critical time duration. When operating GPS golf contents, the set distance is used to determine whether the distance to a tee ground located closest to the current location of the mobile terminal is a movable distance without needing to display a movement path. The set distance may be set according to the user's requirements. For example, the set distance may be 50 meters, 75 meters, or 100 meters.

The critical time duration is a basis of determining whether the location of the mobile terminal is changed during an interruption of GPS signal reception and may be set according to the user's requirement. The first critical distance is a distance from a cup to a boundary of a green. If the cup distance is less than the first critical distance and greater than the second critical distance, the mobile terminal determines that its user is currently on a green, and displays green information on the display unit 130. After displaying the green information, if the cup distance becomes less than the second critical distance, the mobile terminal displays a score record screen on the display unit 130. After displaying a record of scores on the display unit 130, if the cup distance becomes greater than the second critical distance, the mobile terminal displays a path to the next hole and hole information of the next hole on the display unit 130. The second critical distance may be set to be in the range of 1 to 15 meters.

The GPS signal receiver 150 operates under the control of the control unit 160, receives a GPS signal from GPS satellites, and outputs the GPS signal to the control unit 160.

The control unit 160 controls general operation of the mobile terminal. In particular, the control unit 160 calculates the current location of the mobile terminal using the GPS signal received from the GPS signal receiver 150. For this, the control unit 160 may include a location calculator 161.

The control unit 160 calculates a cup distance using the current location of the mobile terminal calculated by the location calculator 161 and coordinates of the corresponding cup stored in the storage unit 140, and controls the display unit 130 to display the result. For this, the control unit 160 may include a cup distance calculator 162.

If a key input signal is received from the input unit 120, the control unit 160 executes a function corresponding to the key input signal.

If an automatic hole guide function is currently set in the mobile terminal, the control unit 160 controls the display unit 130 to automatically display green information, a score record screen, a path to the next hole, and hole information of the next hole, according to the cup distance.

In more detail, if the calculated cup distance is less than the first critical distance and greater than the second critical distance, the control unit 160 controls the display unit 130 to display green information. After displaying the green information, if the cup distance becomes less than the second critical distance, the control unit 160 controls the display unit 130 to display a score record screen. After displaying the score record screen, if the cup distance becomes greater than the second critical distance, the control unit 160 controls the display unit 130 to display a path to the next hole and hole information of the next hole.

FIG. 2 is a flow chart showing a process of operating GPS golf contents in a method of providing golf contents in a mobile terminal according to another exemplary embodiment of the present invention. FIG. 3 shows display screen examples in the process of operating GPS golf contents of FIG. 2.

Figure 3A:
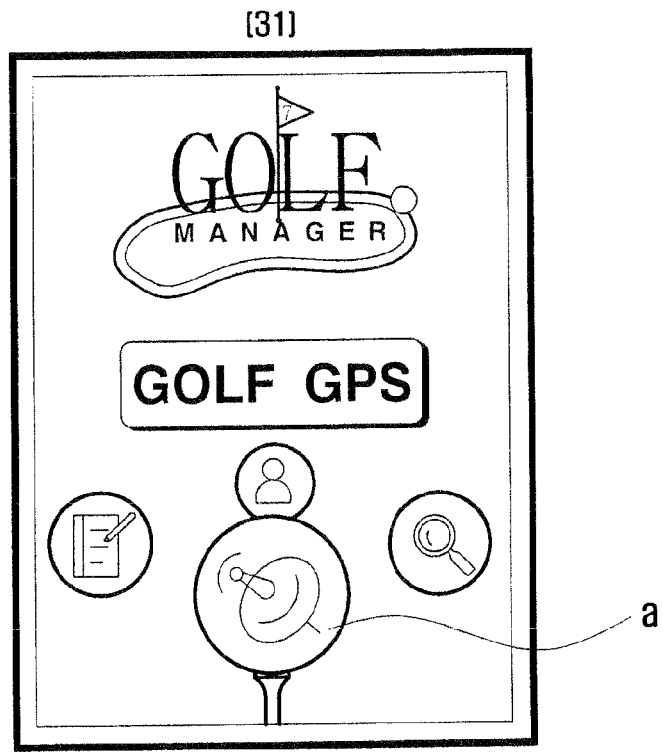
FIG. 3A, FIG. 3B, FIG. 3C, FIG. 3D, and FIG. 3E show display screen examples in the process of operating GPS golf contents of FIG. 2.
Figure 3B:

Referring to FIG. 1, FIG. 2, FIG. 3A, FIG. 3B, FIG. 3C, FIG. 3D, and FIG. 3E, if a user inputs a signal to request operation of GPS golf contents through an icon (a) shown in a display screen example 31 of FIG. 3A, the input unit 120 transmits a signal requesting operation of GPS golf contents to the control unit 160.

When the control unit 160 receives the signal requesting operation of GPS golf contents from the input unit 120, the control unit 160 activates the operation of GPS golf contents (S201). When the operation of GPS golf contents is activated, the control unit 160 controls the GPS signal receiver 150 to receive a GPS signal from GPS satellites.

The control unit 160 then controls the location calculator 161 to calculate the current location of the mobile terminal using the received GPS signal (S202). At this time, the control unit may control the display unit 130 to display a message "Searching satellites, Please wait a moment!," as shown in a display screen example 33 of FIG. 3B.

Figure 3C:
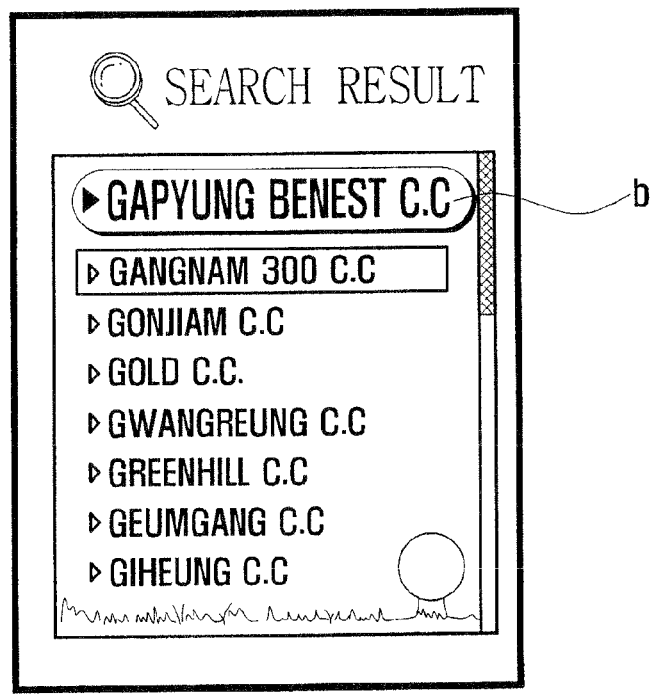
Figure 3D:
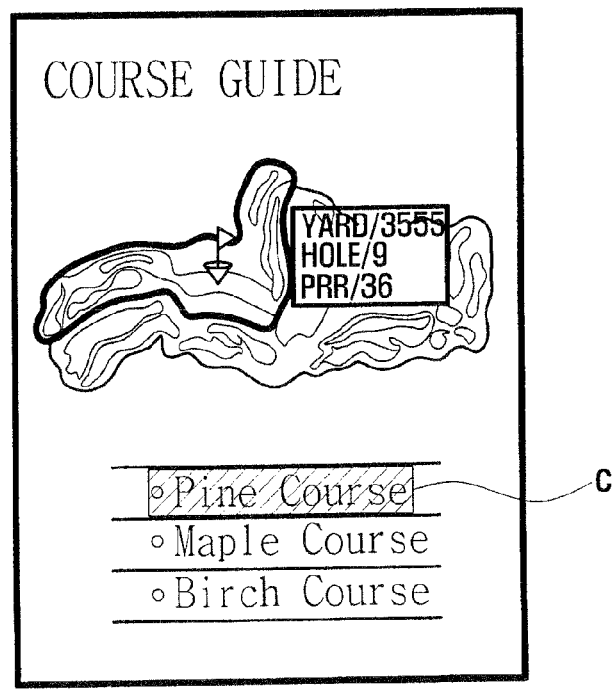

The control unit 160 controls the display unit 130 to display a list of golf country clubs in order of closeness to the current location of the mobile terminal calculated at step S202 (S203), as shown in a display screen example 35 of FIG. 3C. For this, the storage unit 140 of the mobile terminal may store location coordinates of a golf country club. If a golf country club is assumed to be circular, the location coordinates of the golf country club indicate a longitude, a latitude, and an altitude of the center of the golf country club in 3-dimensional coordinates. In the display screen example 35 of FIG. 3C, "Gapyung Benest C.C" (b) is the closest golf country club to the current location of the mobile terminal.

The control unit 160 determines whether a signal selecting a golf country club from the displayed golf country clubs is received from the input unit 120 (S205). If a signal selecting a golf country club is received, the control unit 160 controls the display unit 130 to display courses included in the selected golf country club (S207), for example, Pine Course, Maple Course, and Birch Course, as shown in a display screen example 37 of FIG. 3D.

The control unit 160 determines whether a signal selecting a course from the displayed courses is received from the input unit 120 (S209). If a signal selecting a course is selected (for example, Pine Course (c)), the control unit 160 calculates the current location of the mobile terminal (S211).

The control unit 160 calculates the distance between the current location of the mobile terminal calculated at step S211 and a first tee ground of a first hole of the selected course (S212). The control unit 160 then determines whether the distance calculated at step S212 is less than a set distance (S213). For this, the storage unit 140 of the mobile terminal may store location coordinates of a tee ground included in the golf country club. The first hole may be the first hole of the front nine or the first hole of the back nine, which is the tenth hole on the course, according to the user's setting.

Figure 3E:
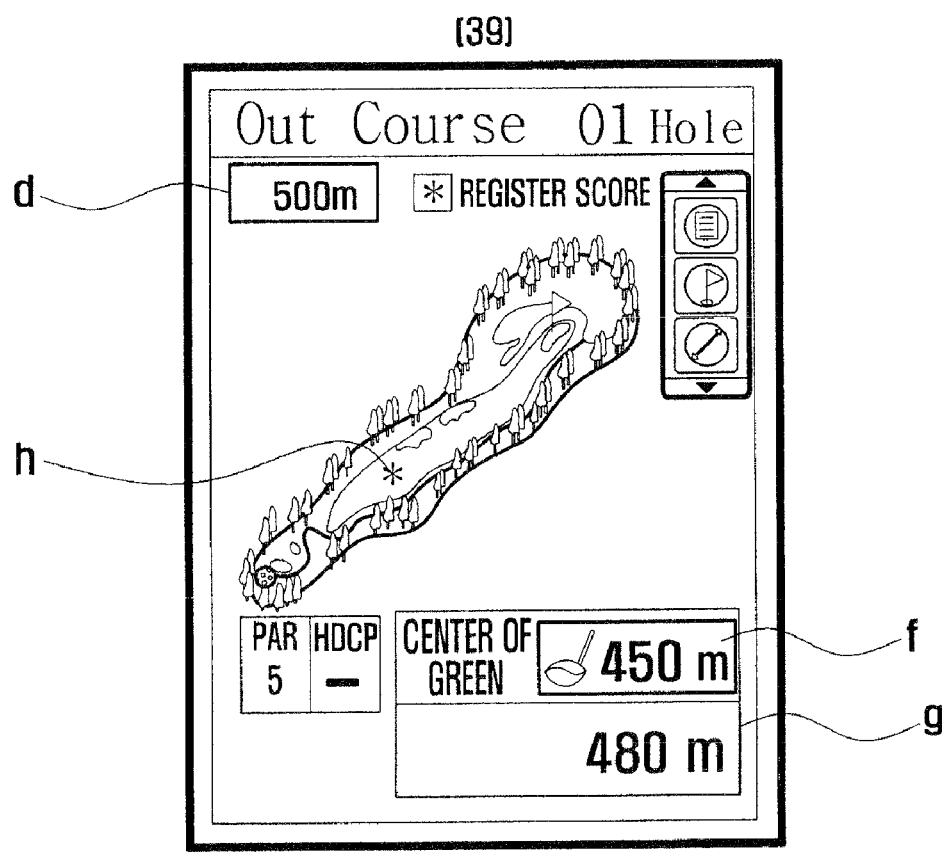

If the distance to the tee ground is less than the set distance at step S213, the control unit 160 controls the display unit 130 to display hole information of the first hole (S215), for example, the first hole of the front nine, as shown in a display screen example 39 of FIG. 3E.

The hole information may include a hole distance (d), a green distance (f), a cup distance (g), and the current location of the mobile terminal (h), which may be determined by matching them with a hole map, as shown in the display screen example 39 of FIG. 3E.

If the distance to the tee ground is greater than or equal to the set distance at step S213, the control unit 160 controls the display unit 130 to display a path from the current location to the first hole (S214). The process then returns to step S211 and the control unit 160 continues to calculate the distance to the tee ground until the distance becomes less than the set distance.

In another exemplary embodiment of the present invention, if a golf country club is selected, the mobile terminal calculates the current location. If the distance from the calculated current location to a tee ground of the closest hole is greater than the set distance, the mobile terminal displays a screen for selecting a course. If the distance from the calculated current location to a tee ground of the closest hole is less than or equal to the set distance, the mobile terminal displays hole information of the corresponding hole.

Figure 4A:
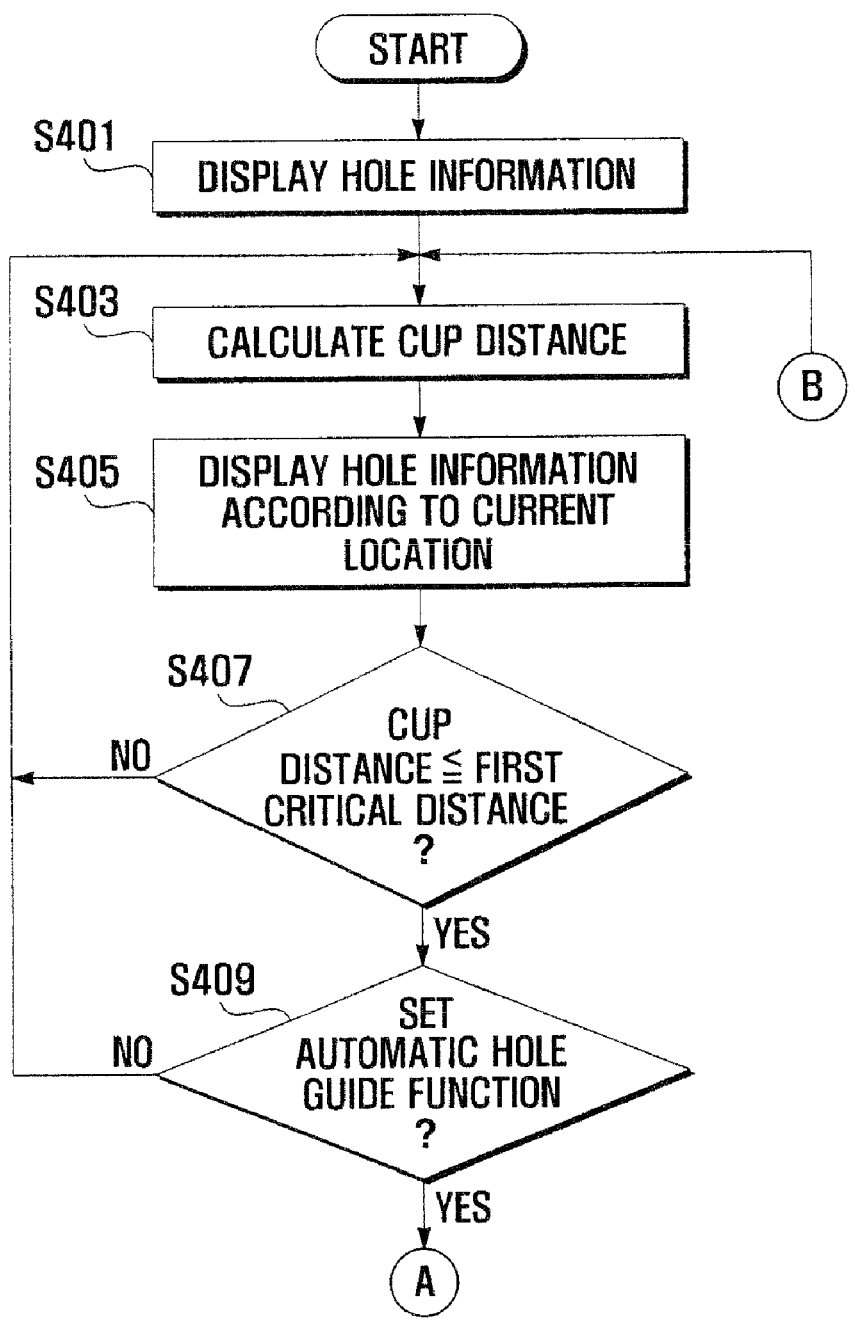
FIG. 4A and FIG. 4B are flow charts showing a process of executing an automatic hole guide function in the method of providing golf contents in a mobile terminal of FIG. 2.
Figure 4B:
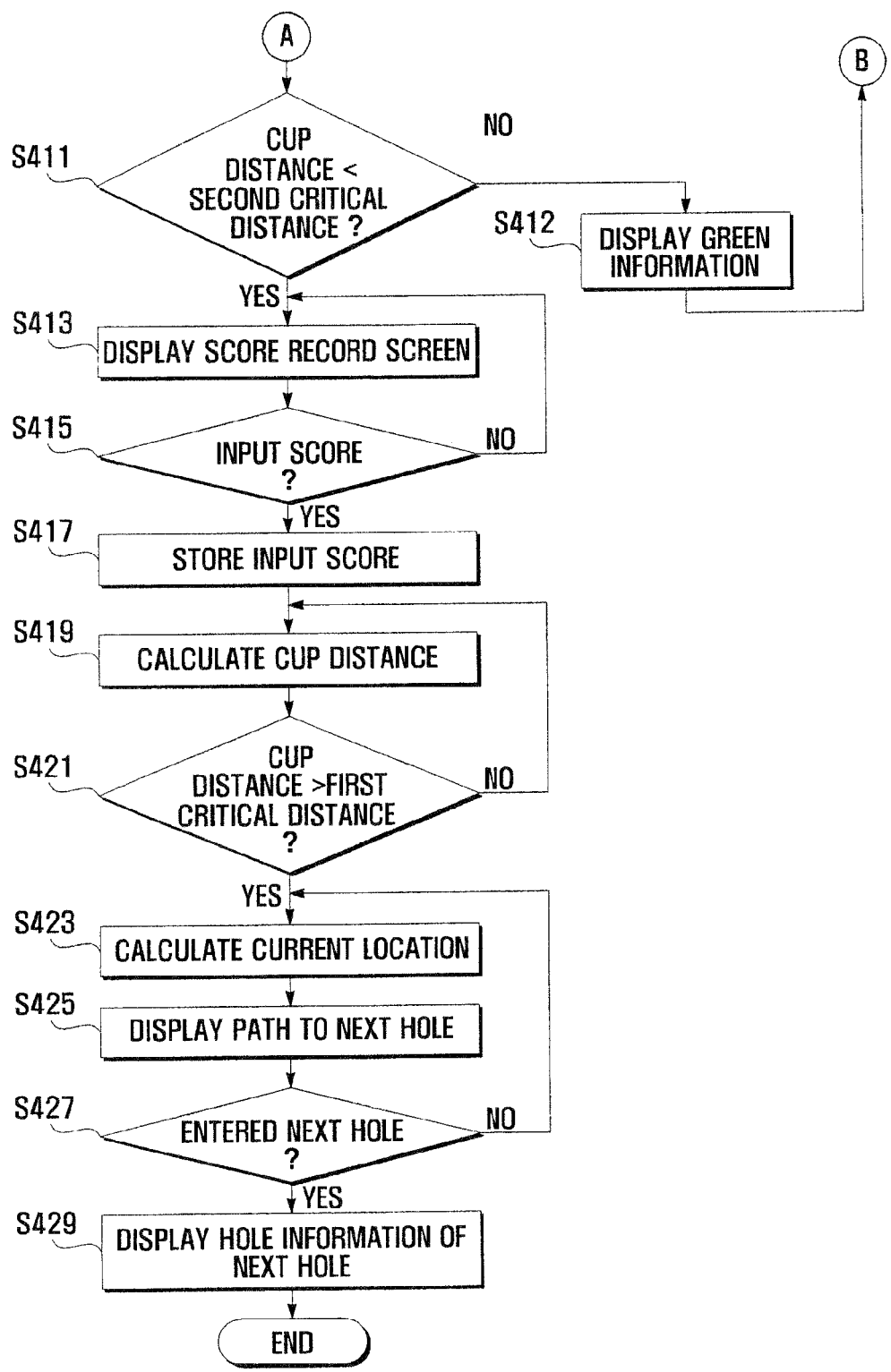

FIG. 4A and FIG. 4B are flow charts showing a process of executing an automatic hole guide function in the method of providing golf contents in a mobile terminal of FIG. 2. FIG. 5 shows display screen examples in the process of executing an automatic hole guide function.

Figure 5A:
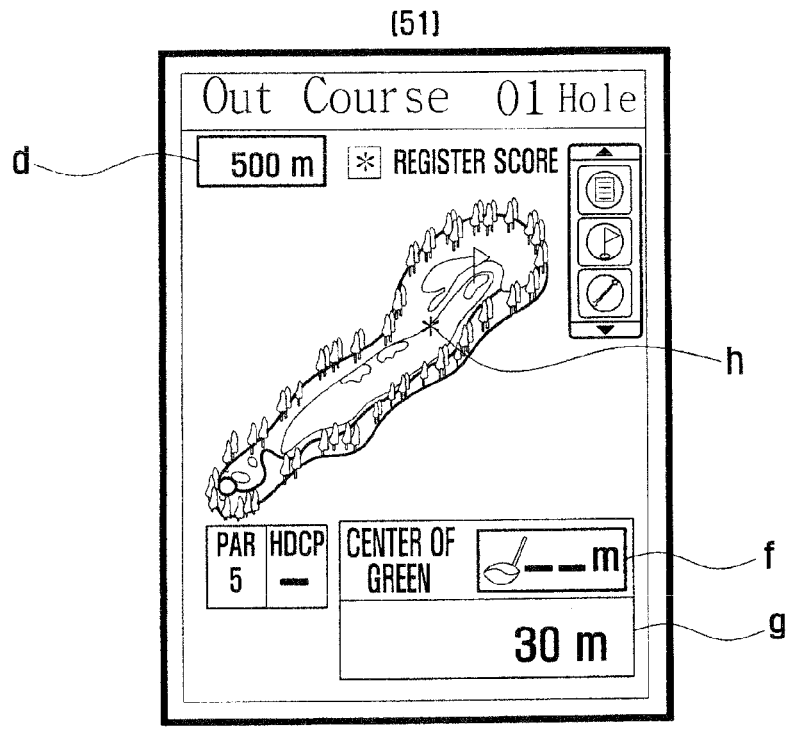
FIG. 5A, FIG. 5B, FIG. 5C, FIG. 5D, and FIG. 5E show display screen examples in the process of executing an automatic hole guide function of FIG. 4A and FIG. 4B.
Figure 5B:
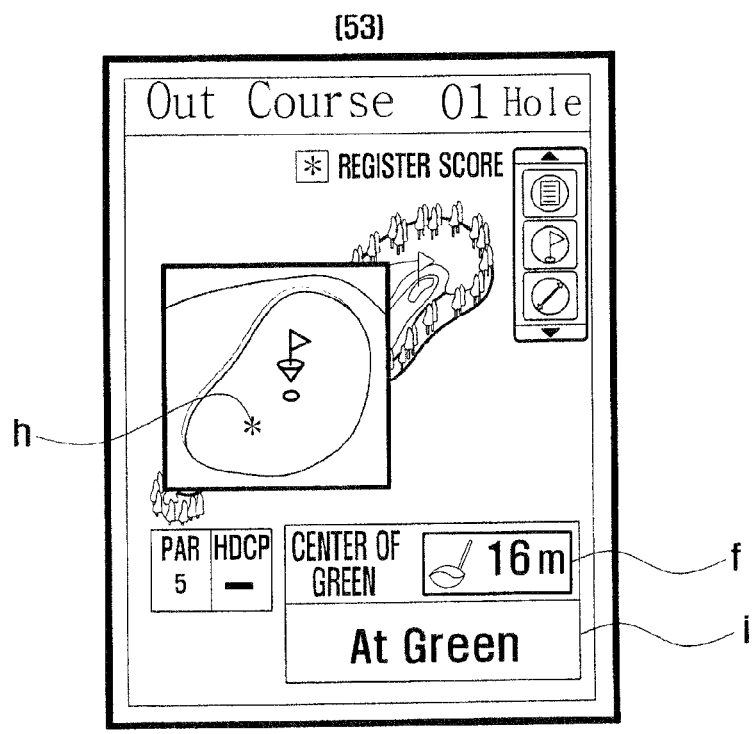

Referring to FIG. 4A, FIG. 4B, FIG. 5A, FIG. 5B, FIG. 5C, FIG. 5D, and FIG. 5E, hole information is first displayed in the display unit 130 (S401), as shown in a display screen example 51 of FIG. 5A. When the hole information is displayed, the control unit 160 calculates the current location of the mobile terminal by activating the GPS signal receiver 150 and location calculator 161. The control unit 160 then calculates a cup distance by activating the cup distance calculator 162 (S403).

The cup distance may be calculated using coordinates of the cup stored in the storage unit 140 and the coordinates of the current location of the mobile terminal calculated at step S401.

The control unit 160 updates hole information including a hole distance (d), a green distance (f), a cup distance (g), and the current location of the mobile terminal (h) according to the calculated result, and controls the display unit 130 to display the hole information (S405), as shown in a display screen example 51 of FIG. 5A.

The control unit 160 determines whether the cup distance calculated at step S403 is less than or equal to the first critical distance (for example, 30 meters) (S407). If the cup distance is greater than the first critical distance, the control unit 160 determines that the mobile terminal has not yet arrived at the green, and the process returns to step S403 to repeat the calculation of the cup distance. If the cup distance is less than or equal to the first critical distance at step S407, the control unit 160 determines that the mobile terminal has arrived at the green, and determines whether an automatic hole guide function is set in the mobile terminal (S409).

If an automatic hole guide function is not set in the mobile terminal, the control unit 160 returns to step S403 and repeats the calculation of the cup distance. If an automatic hole guide function is set in the mobile terminal at step S409, the control unit 160 determines whether the calculated cup distance is less than the second critical distance (S411). This is to identify whether the mobile terminal is currently close to the cup.

If the cup distance is not less than the second critical distance (for example, 15 meters) at step S411, the control unit 160 determines that the mobile terminal is currently on the green but not close to the cup, and controls the display unit 130 to display green information (S412). As shown in a display screen example 53 of FIG. 5B, the green information is displayed as a location of the mobile terminal and a location of a cup by matching the green information with a map of the green of the hole at which the mobile terminal is located. The control unit 160 then returns to step S403 and repeats the calculation of the cup distance.

Figures 5C, 5D:
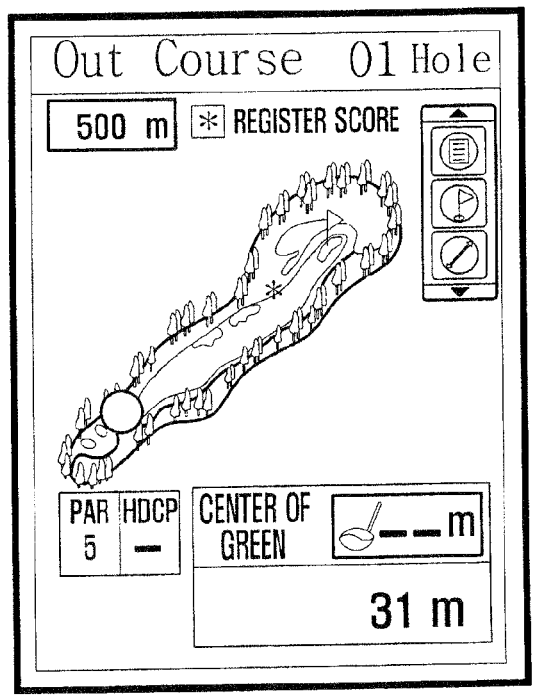

If the cup distance is less than the second critical distance at step S411, the control unit 160 controls the display unit 130 to display a score record screen (S413), as shown in a display screen example 55 of FIG. 5C. This is because the control unit 160 determines that the mobile terminal is close to the cup and the user is ready to putt their golf ball into the cup and to record a hole score. Subsequently, the control unit 160 determines whether a score is received from the input unit 120 (S415). If a hole score is not received from the input unit 120, the process returns to step S413 and the control unit 160 continues to display the score record screen until the hole score is received. If a hole score is received at step S415, the control unit 160 stores the input hole score in the storage unit 140 (S417). The control unit 160 then activates the cup distance calculator 162 to calculate a cup distance (S419), and determines whether the calculated cup distance is greater than the first critical distance (for example, 30 meters) (S421).

If the cup distance is not greater than the first critical distance, the process returns to step S413 and the control unit 160 continues to display the score record screen. If the cup distance (for example, 31 meters) is greater than the first critical distance at step S421, as shown in a display screen example 57 of FIG. 5D, the control unit 160 controls the display unit 130 to display a path from the current location to the next hole (S423). For this, the path may be displayed as coordinates of the current location of the mobile terminal and coordinates of a tee ground of the next hole, which are stored in the storage unit 140. As the user moves, the control unit 160 calculates the current location of the mobile terminal (S425).

The control unit 160 determines whether the mobile terminal has arrived at the next hole (S427). The arrival of the mobile terminal at the next hole may be determined according to whether the coordinates of the current location calculated at step S425 are within a region defined by hole boundary coordinates stored in the storage unit 140. If the mobile terminal has not arrived at the next hole at step S427, the process returns to step S423 and the control unit 160 continues to display the path to the next hole until the mobile terminal arrives at the next hole.

Figure 5E:
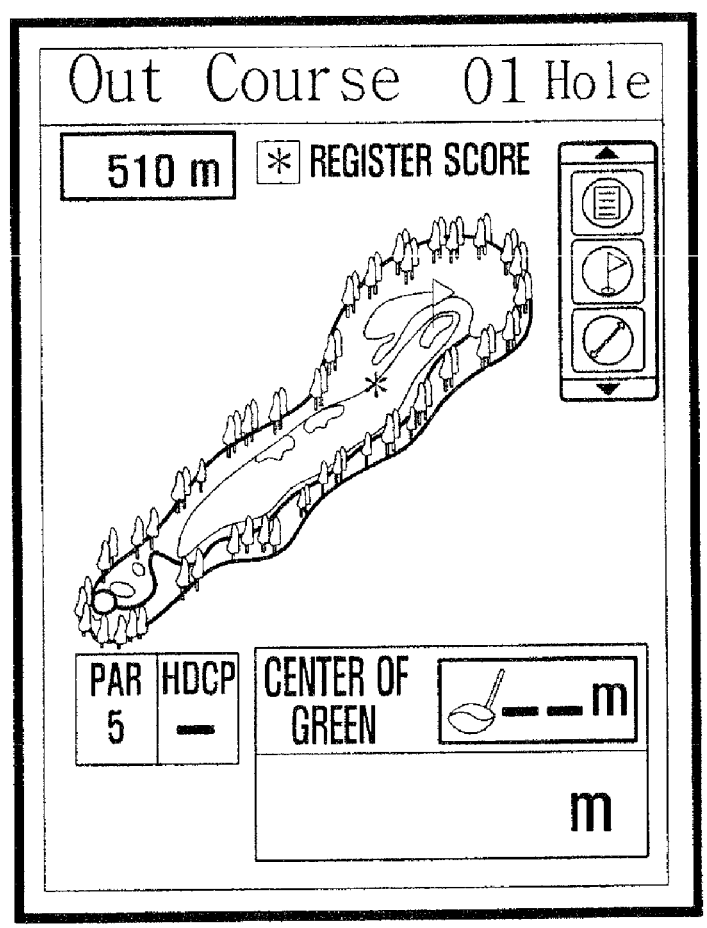

If the mobile terminal has arrived at the next hole at step S427, the control unit 160 controls the display unit 130 to display hole information of the next hole (S429), as shown in a display screen example 59 of FIG. 5E.

In this exemplary embodiment, a method of proceeding from a tee ground towards a cup, putting a golf ball into the cup, storing a score, and moving to a next hole has been described. However, the present invention is not limited thereto, and may also include other exemplary embodiment for the cases, such as not moving to a next hole after storing a score and moving in the opposite direction.

Figure 6A:
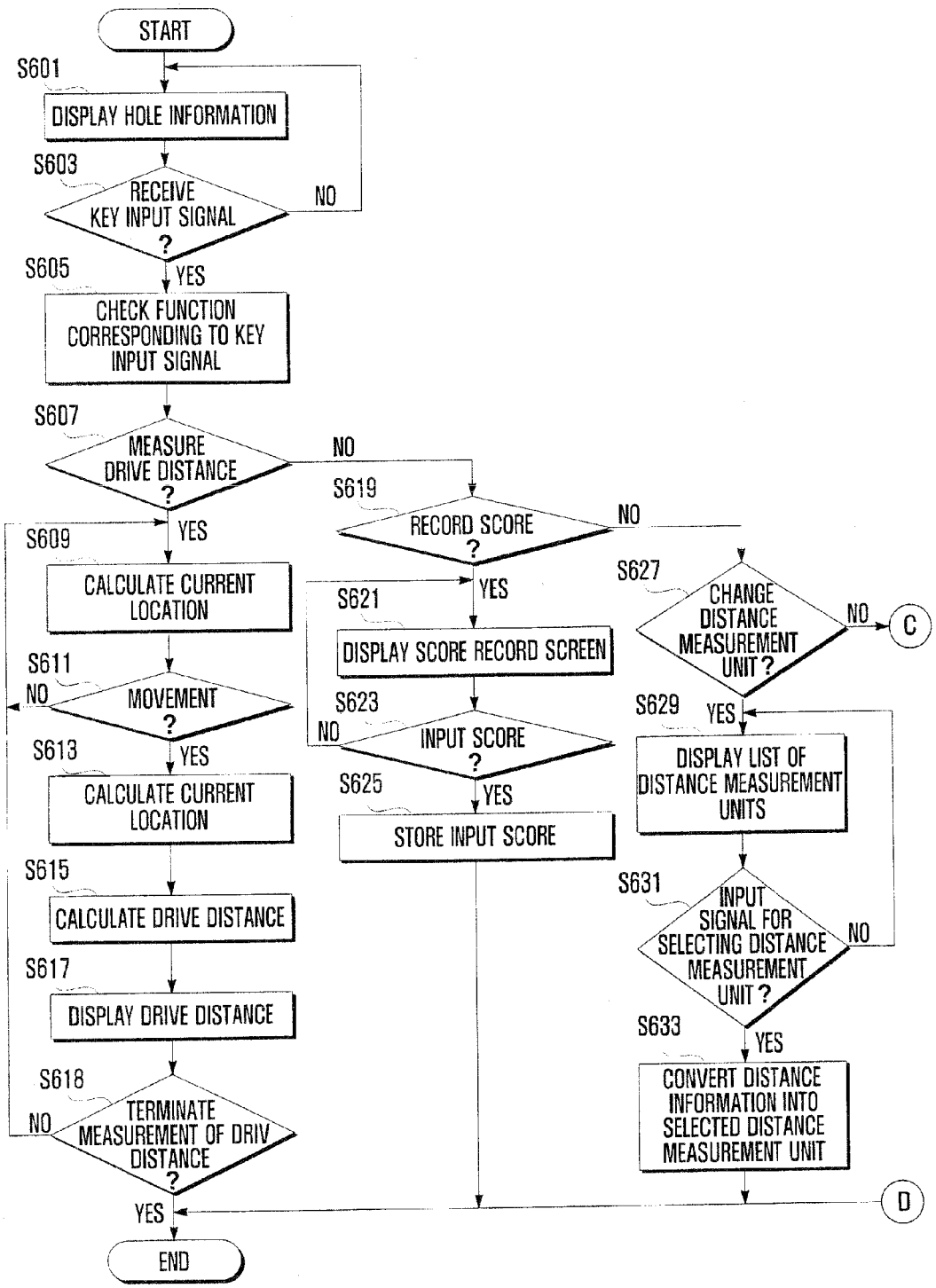
FIG. 6A and FIG. 6B are flow charts showing a process of executing a function according to a key input in the method of providing golf contents in a mobile terminal of FIG. 2.
Figure 6B:
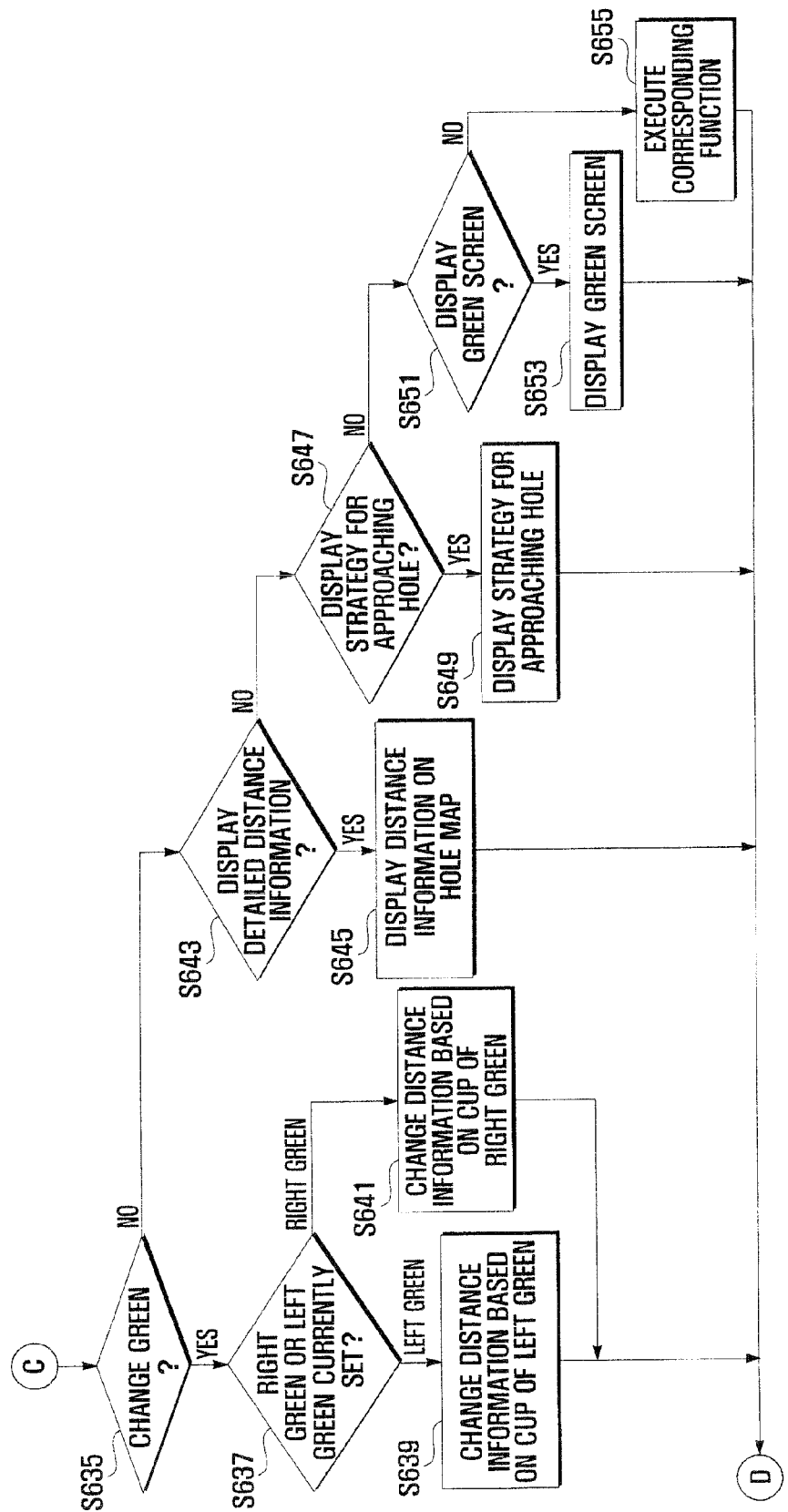

FIG. 6A and FIG. 6B are flow charts showing a process of executing a function according to a key input in the method of providing golf contents in a mobile terminal of FIG. 2. FIG. 7A, FIG. 7B, FIG. 7C, FIG. 7D, FIG. 7E, FIG. 7F, and FIG. 7G are display screen examples in the process of executing a function according to a key input.

Referring to FIG. 6A, FIG. 6B, FIG. 7A, FIG. 7B, FIG. 7C, FIG. 7D, FIG. 7E, FIG. 7F, and FIG. 7G, hole information is first displayed in the display unit 130 (S601), and the control unit 160 determines whether a key input signal is received from the input unit 120 (S603). If no key input signal is received from the input unit 120, the control unit 160 returns to step S601 and continues to display the hole information.

If a key input signal is received from the input unit 120 at step S603, the control unit 160 identifies a function corresponding to the key input signal (S605), and determines whether the identified function corresponding to the key input signal is for measuring a drive distance (S607). If the function corresponding to the key input signal is for measuring a drive distance, the control unit 160 calculates the current location of the mobile terminal (S609). The calculated current location of the mobile terminal may be displayed on a hole map, as shown in a display screen example 72 of FIG. 7A. The control unit 160 then determines whether movement of the mobile terminal is detected (S611).

If movement of the mobile terminal is detected, the control unit 160 calculates a new location of the moving mobile terminal (S613). The control unit 160 then calculates a drive distance using the locations of the mobile terminal calculated at steps S609 and S613 (S615), and controls the display unit 130 to display the calculated drive distance (S617), as shown in a display screen example 73 of FIG. 7B. Subsequently, the control unit 160 determines whether a signal for termination of measuring a drive distance is input (S618).

If no signal for termination of measuring a drive distance is input, the process returns to step S609 and the control unit 160 continues to calculate the current location to detect further movement. If a signal for termination of measuring a drive distance is input at step S618, the control unit 160 terminates the measurement of drive distance. The measurement of drive distance may be performed in real time according to a location change of the mobile terminal.

However, in another exemplary embodiment of the present invention, a starting point and ending point of the measurement of drive distance are input by a user, and the distance between the two points is measured as a drive distance. In this exemplary embodiment of the present invention, if a signal for measuring a drive distance is input, the control unit 160 calculates a first location of the mobile terminal, and if a signal for termination of measuring a drive distance is input, the control unit 160 calculates a second location of the mobile terminal. The control unit 160 then calculates the distance between the first location and the second location, and controls the display unit 130 to display the calculated distance as the drive distance.

If the identified function corresponding to the key input signal received at step S603 is not for measuring a drive distance at step S607, the control unit 160 determines whether the received key input signal is for recording a hole score (S619). If the received key input signal is for recording a hole score, the control unit 160 controls the display unit 130 to display a score record screen (S621), as shown in a display screen example 74 of FIG. 7C. The control unit 160 determines whether a hole score is input from the input unit 120 (S623).

If no score is input from the input unit 120, the control unit 160 continues to display the score record screen at step S621. If a score is input from the input unit 120, the control unit 160 stores the input score (S625), as shown in a display screen example 76 of FIG. 7D.

If the identified function corresponding to the key input signal received at step S603 is not for recording a score at step S619, the control unit 160 determines whether the received key input signal is for changing a distance measurement unit (S627). If the received key input signal is for changing a distance measurement unit, the control unit 160 controls the display unit 130 to display a list of distance measurement units supported by the mobile terminal (S629). At this time, the distance measurement units may be displayed by excluding a distance measurement unit currently set in the mobile terminal.

The control unit 160 determines whether a signal selecting a distance measurement unit is received from the input unit 120 (S631). If no signal selecting a distance measurement unit is received from the input unit 120, the process returns to step S629 and the control unit 160 continues to display the distance measurement units supported by the mobile terminal. If a signal selecting a distance measurement unit is received from the input unit 120, the control unit 160 converts distance information into a new distance measurement unit corresponding to the received signal of distance measurement unit selection and controls the display unit 130 to display the converted distance information (S633).

In another exemplary embodiment of the present invention, the control unit 160 changes the distance measurement unit between meters and yards, which are generally used at a golf country club, alternatively whenever a signal of distance measurement unit change is input.

If the identified function corresponding to the key input signal received at step S603 is not for changing a distance measurement unit at step S627, the control unit 160 determines whether the received key input signal is for changing a green (S635). If the received key input signal is for changing a green between the right green and the left green, the control unit 160 checks whether the right green or the left green is currently set in the mobile terminal (S637). If the right green is currently set in the mobile terminal, the control unit 160 changes the right green to the left green and changes the distance information based on a cup located in the left green (S639). If the left green is currently set in the mobile terminal at step S637, the control unit 160 changes the left green to the right green and changes the distance information based on a cup located in the right green (S641).

Figure 7A:
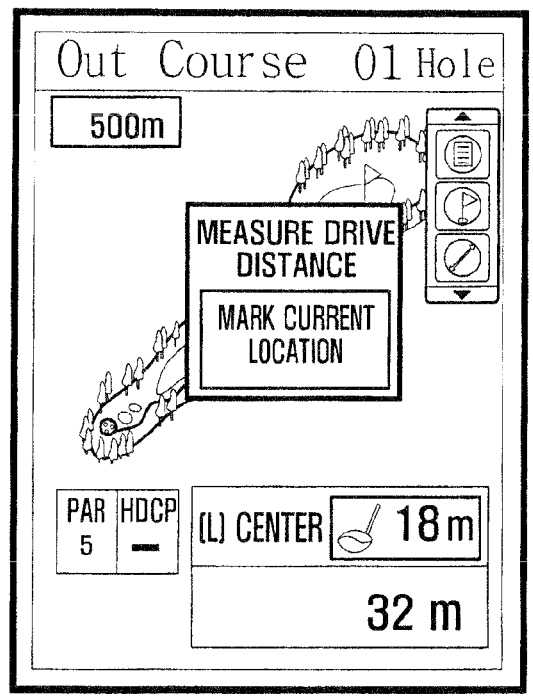
Figure 7B:
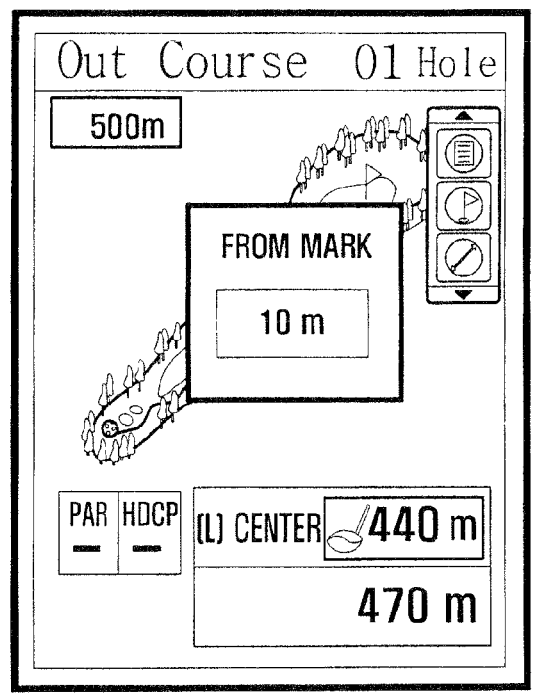
Figure 7E:
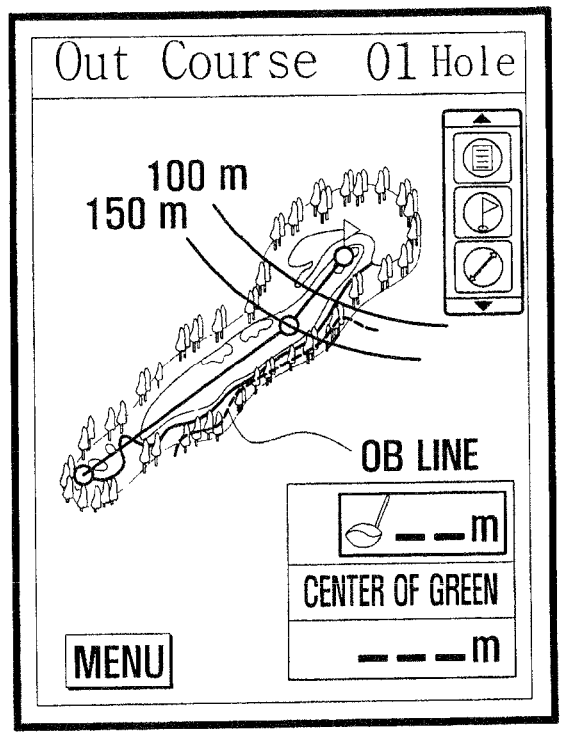

If the identified function corresponding to the key input signal received at step S603 is not for changing a green at step S635, the control unit 160 determines whether the function corresponding to the received key input signal is for displaying detailed distance information (S643). If a function corresponding to the received key input signal is for displaying detailed distance information, the control unit 160 controls the display unit 130 to display distance information corresponding to the current location of the mobile terminal on the hole map (S645), as shown in FIG. 7E. The distance information includes a drive distance, a cup distance, a green distance, and the current location of the mobile terminal.

Figure 7F:
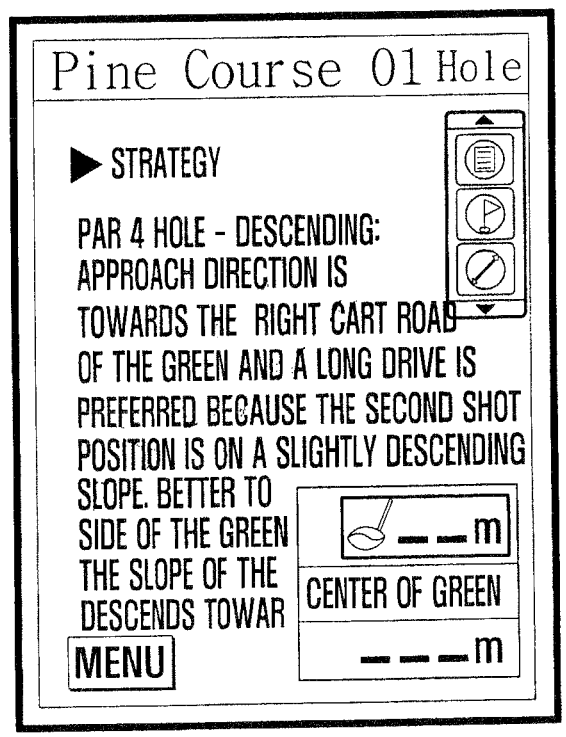

If the identified function corresponding to the received key input signal is not for displaying detailed distance information at step S643, the control unit 160 determines whether the function corresponding to the received key input signal is for displaying a strategy for approaching a hole (S647). If the function corresponding to the received key input signal is for displaying a strategy for approaching a hole, the control unit 160 controls the display unit 130 to display the strategy for approaching the hole including the coordinates of the current location (S649), as shown in FIG. 7F.

Figure 7G:
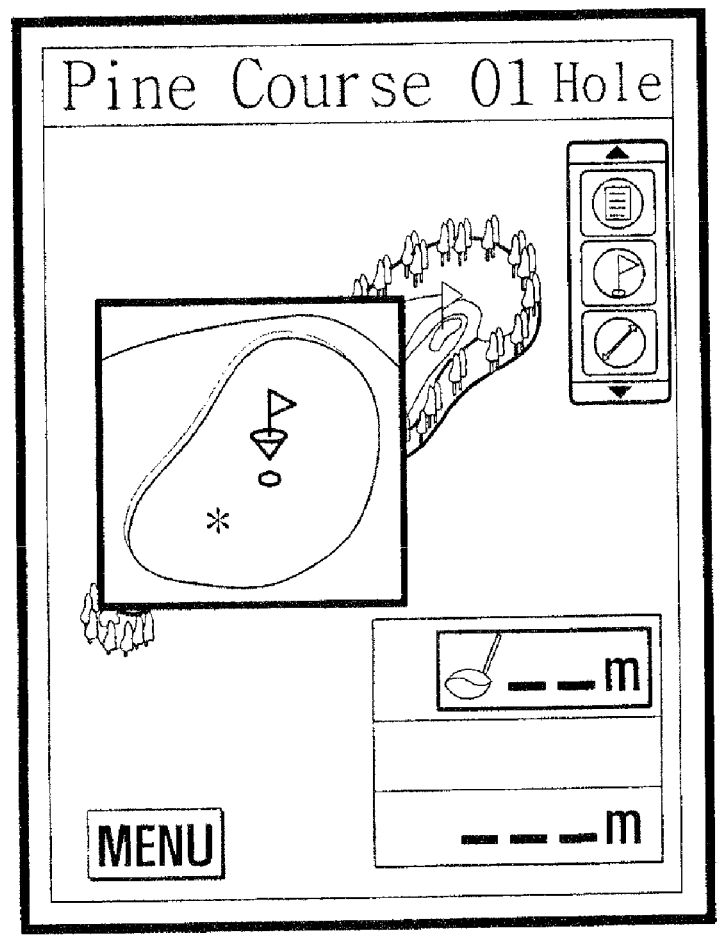

If the identified function corresponding to the received key input signal is not for displaying a strategy for approaching a hole at step S647, the control unit 160 determines whether the function corresponding to the received key input signal is for displaying a green screen (S651). If the function corresponding to the received key input signal is for displaying a green screen, the control unit 160 controls the display unit 130 to display a green screen of a hole including the coordinates of the current location (S653), as shown in FIG. 7G.

If the identified function corresponding to the received key input signal is not for displaying a green screen at step S651, the control unit 160 executes another function corresponding to the received key input signal that is not described in FIG. 6A and FIG. 6B, such as character message transmission and telephone communication (S655).

Figure 8A:
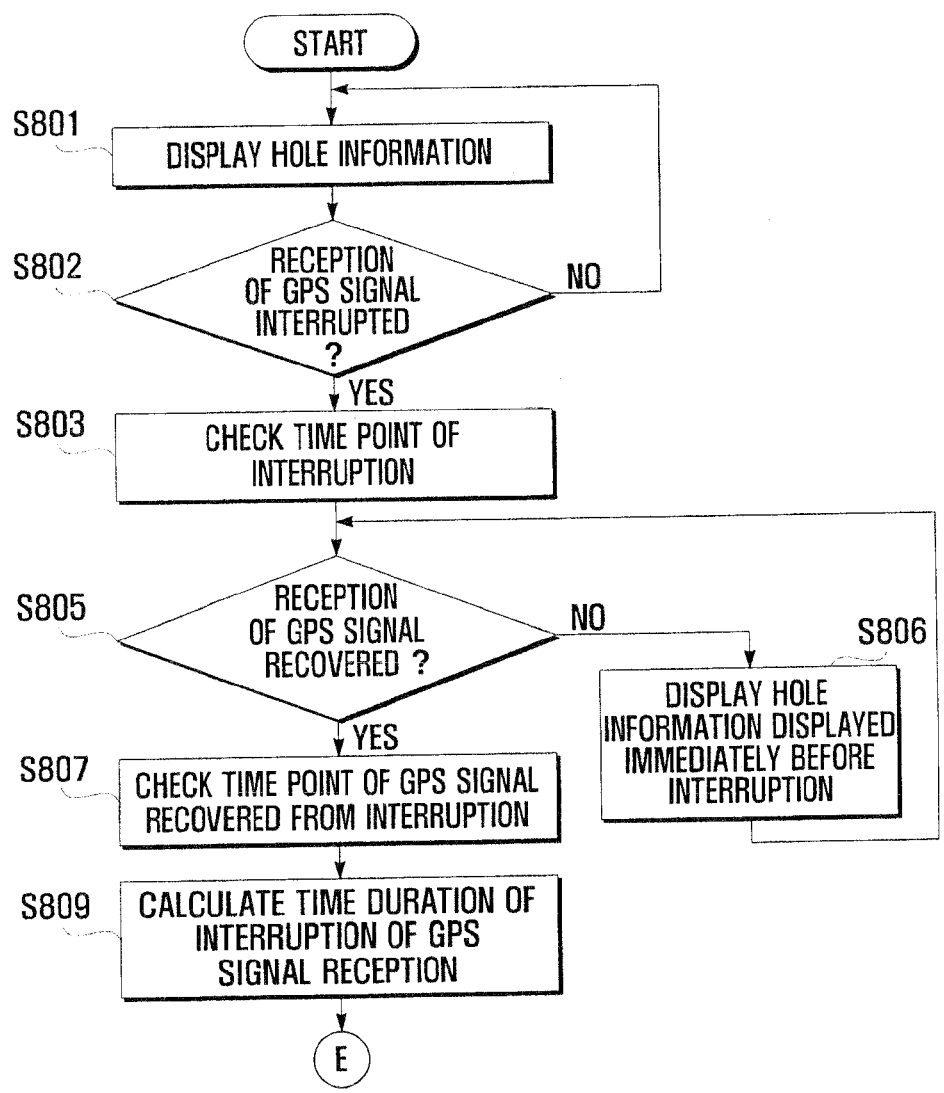
FIG. 8A and FIG. 8B are flow charts showing a process of providing golf contents in the case that reception of a GPS signal is recovered after an interruption in the method of providing golf contents in a mobile terminal shown in FIG. 2.
Figure 8B:
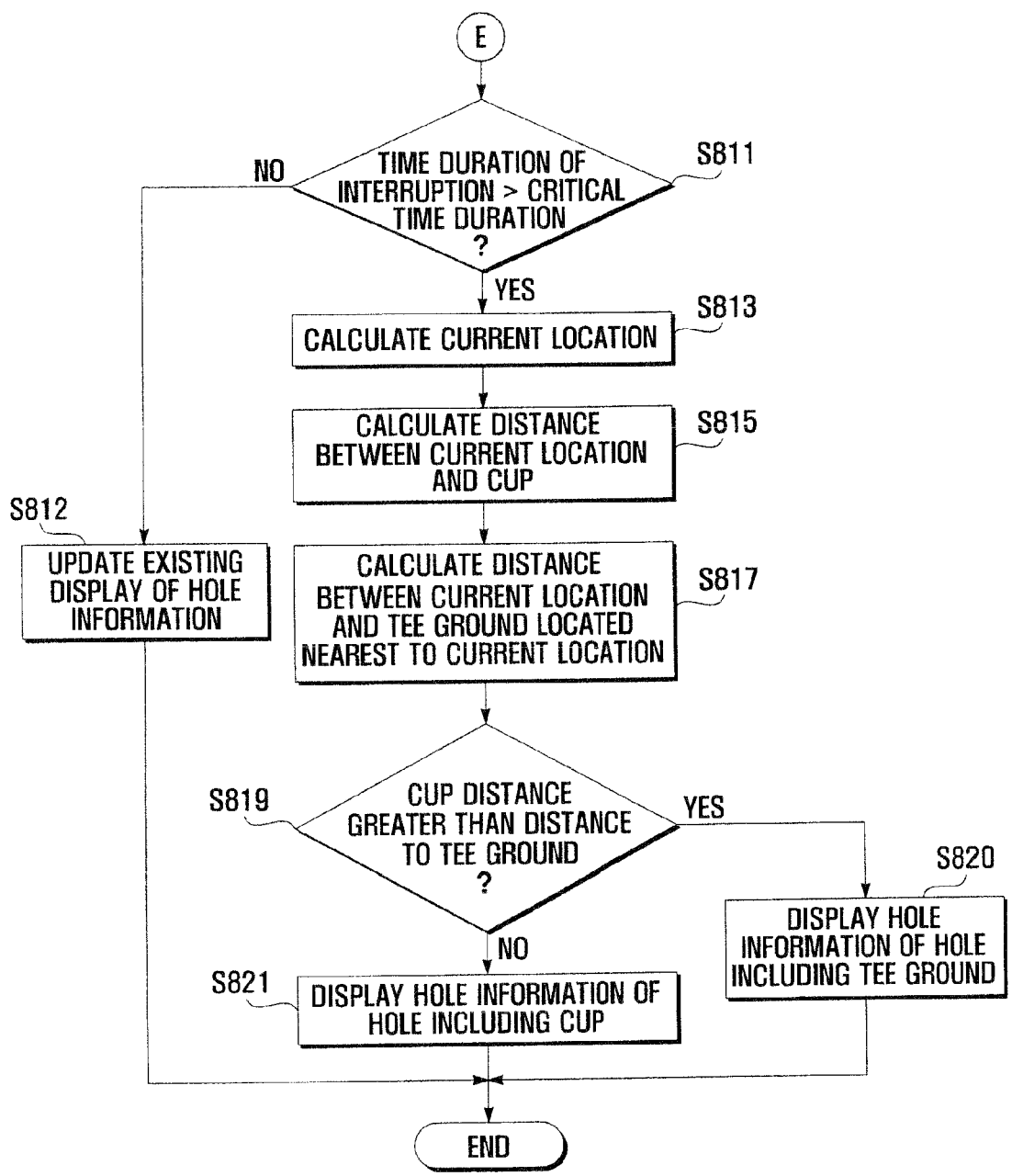

FIG. 8 is a flow chart showing a process of providing golf contents in the case that reception of a GPS signal is recovered after interruption in the method of providing golf contents in a mobile terminal of FIG. 2. Referring to FIG. 1 and FIG. 8, hole information is displayed in the mobile terminal (S801), and the control unit 160 of the mobile terminal determines whether reception of a GPS signal is interrupted (S802).

If reception of a GPS signal is not interrupted, the process returns to step S801 and the control unit 160 continues to display the hole information. If reception of a GPS signal is interrupted at step S802, the control unit 160 checks the time point of the interruption of GPS signal reception (S803).

The control unit 160 then determines whether the reception of GPS signal is recovered (S805). If the reception of a GPS signal is not recovered, the control unit 160 controls to display the hole information displayed immediately before the interruption of GPS signal reception (S806), and the process returns to step S805 to determine whether reception is recovered. If the reception of a GPS signal is recovered at step S805, the control unit 160 checks the time point of the recovery of GPS signal reception (S807).

The control unit 160 calculates the time duration of the interruption by using the time points checked at steps S803 and S807 (S809). The control unit 160 then determines whether the calculated time duration of the interruption exceeds a critical time duration (S811).

If the calculated time duration of the interruption does not exceed a critical time duration, the control unit 160 calculates the current location of the mobile terminal, and updates the existing display of hole information according to the calculated location (S812).

If the calculated time duration of the interruption exceeds a critical time duration, the control unit 160 calculates the current location of the mobile terminal (S813). The critical time duration is a basis for determining whether the mobile terminal has moved while the GPS signal is interrupted. Having calculated the current location at step S813, the control unit 160 calculates the distance between the calculated location of the mobile terminal and the cup closest thereto (S815), and the distance between the calculated location of the mobile terminal and the tee ground closest thereto (S817). For the calculation of the distance to the cup and the distance to the tee ground, the storage unit 140 of the mobile terminal may store coordinates of a cup and a tee ground for each hole.

The control unit 160 determines whether the distance to the cup calculated at step S815 is greater than the distance to the tee ground calculated at step S817 (S819). If the distance to the cup is greater than the distance to the tee ground, the control unit 160 controls to display hole information of the hole in which the tee ground is located (S820). If the distance to the cup is less than or equal to the distance to the tee ground at step S819, the control unit 160 controls to display hole information of the hole in which the cup is located (S821).

As described above, exemplary embodiments of the present invention provide golf contents using the current location of the mobile terminal.

With the help of the golf contents provided by exemplary embodiments of the present invention, even an unskilled user may conveniently utilize the golf contents without any difficulty.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer-implemented method for providing information associated with a mobile terminal using a Global Positioning System (GPS), the method comprising:
    calculating, by a processor of the computer, a distance between the mobile terminal and a hole cup;
    displaying hole information in response to a determination of the distance being greater than a first threshold distance;
    displaying green information in response to a determination of the distance being less than or equal to the first threshold distance and greater than a second threshold distance;
    displaying a score record screen in response to a determination of the distance being less than or equal to the second threshold distance determining whether a score is received from an input unit while displaying the score record screen;
    storing, when the score is received from the input unit, the received score; and
    displaying next hole information after storing the received score; wherein displaying next hole information comprises:
    determining whether a location of the mobile terminal is within a region of the next hole;
    displaying a path from the location of the mobile terminal to the next hole if the location of the mobile terminal is not determined within the region of the next hole; and
    displaying hole information of the next hole if the location of the mobile terminal is determined within the region of the next hole.

2. The method of claim 1, wherein the first threshold distance comprises a distance between the hole cup and a perimeter boundary of a green of the hole.

3. The method of claim 1, wherein the second threshold distance comprises a putting distance in the range of 1 to 15 meters from the hole cup.

4. The method of claim 1, wherein the hole information comprises the location of the mobile terminal, a hole distance from a tee ground to the hole cup, a cup distance from the location of the mobile terminal to the hole cup, and a green distance from the location of the mobile terminal to the hole cup.

5. The method of claim 4, wherein the location of the mobile terminal is displayed associated with topographical information of the hole by determining the location of the mobile terminal associated with an image of a map of the hole.

6. The method of claim 1, wherein the green information is displayed associated with topographical information of the green by determining the location of the mobile terminal and the hole cup.

7. The method of claim 1, wherein the score record screen is configured to receive an input of a score and to display information associated with a number of strokes corresponding to each hole and respective players.

8. The method of claim 1, further comprising:
    displaying a list of golf courses from the closeness to the location of the mobile terminal upon receiving an requesting signal associated with operation of golf contents;
    calculating the location of the mobile terminal in response to detection of a course being selected from the list;
    calculating the distance between the location of the mobile terminal and a tee ground of a hole;
    displaying a path to the tee ground of the hole if the calculated distance is determined greater than a third threshold distance; and
    displaying hole information of the hole if the calculated distance is determined less than or equal to the third threshold distance.

9. The method of claim 8, wherein the third threshold distance is determined according to a distance from each hole to the location and the hole comprises the closest hole to the location.

10. The method of claim 8, wherein the hole comprises a first hole of the selected course.

11. The method of claim 8, wherein the third threshold distance comprises a distance to the tee ground nearest to the location of the mobile terminal.

12. The method of claim 1, further comprising:
    calculating a time duration of a Global Positioning System (GPS) signal interruption if reception of the GPS signal is recovered after interruption;
    determining whether the interruption duration exceeds a threshold duration; and
    displaying hole information of the hole closest to the location if the interruption duration is determined exceeding the threshold duration.

13. The method of claim 12, wherein displaying hole information comprises:
    calculating the location of the mobile terminal; and
    displaying hole information of a hole by calculating a distance of the hole cup that is closest to the location.

14. The method of claim 12, wherein displaying hole information comprises:
    calculating the location of the mobile terminal;
    calculating the distance to the hole cup that is closest to the location and the distance to a tee ground from the location;

displaying hole information of the closest hole cup if the distance to the closest hole cup is determined less than the distance to the tee ground; and displaying hole information of the tee ground if the distance to the closest hole cup is determined greater than the distance to the tee ground.

15. The method of claim 12, further comprising:

displaying the hole information before detection of the GPS signal interruption if the interruption duration is determined not exceeding the threshold duration.

16. The method of claim 12, wherein the threshold duration is determined according to a distance changing of the mobile terminal during the interruption of the GPS signal reception.

17. A computer-implemented method for providing information associated with a mobile terminal using a Global Positioning System (GPS), the method comprising:

displaying a list of golf courses from the closest distance of a location of the mobile terminal in response to detection of a requesting signal associated with operation of golf contents;

calculating, by a processor of the computer, a distance between the mobile terminal and a tee ground of a hole of a course upon detection of the course being selected;

displaying a path to the tee ground of the hole in response to a determination of the calculated distance being greater than a threshold distance;

displaying hole information of the hole in response to a determination of the calculated distance being less than or equal to the threshold distance;

calculating, by the processor, a distance between the location of the mobile terminal and hole cup of the hole;

displaying green information, in response to a determination of the distance being less than or equal to a first threshold distance and greater than a second threshold distance;

displaying a score record screen in response to a determination of the cup distance less than or equal to the second threshold distance;

determining whether a score is received from an input unit while displaying the score record screen;

storing, when the score is received from the input unit, the received score; and displaying next hole information after storing the received score, wherein displaying next hole information comprises:

determining whether the location of the mobile terminal is within a region of the next hole;

displaying a path from the location of the mobile terminal to the next hole if the location of the mobile terminal is not determined within the region of the next hole; and displaying hole information of the next hole if the location of the mobile terminal is determined within the region of the next hole.

18. The method of claim 17, wherein the first threshold distance comprises a distance from the hole cup and a perimeter boundary of a green of the hole cup.

19. The method of claim 17, wherein the second threshold distance comprises within a putting distance range comprising 1 to 15 meters from the hole cup.

20. An apparatus comprising:

a processor coupled to the apparatus configured to calculate a distance between the apparatus and a hole cup to provide information using a Global Positioning System (GPS), the information being selectively displayed according to the calculated distance associated with a first threshold distance and a second threshold distance specified for selectively displaying the information, and the processor is configured to display hole information in response to determination of the distance being greater than the first threshold distance, wherein the first threshold distance comprises a distance between the hole cup and a perimeter boundary of a green of the hole, and to display green information in response to a determination of the distance being less than or equal to the first threshold distance and greater than the second threshold distance which comprises within a putting distance from the hole cup, and to display a score record screen in response to a determination of the distance which is less than or equal to the second threshold distance, wherein the processor is configured to determine whether a score is received from an input unit while displaying the score record screen, and to store, when the score is received from the input unit, the received score and to display next hole information after storing the received score, and wherein the processor is further configured to display next hole information that comprises:

the processor is configured to determine a location of the apparatus whether the location is within a region of the next hole;

the processor is configured to display a path from the location of the apparatus to the next hole if the location of the apparatus is not determined within the region of the next hole; and the processor is configured to display hole information of the next hole if the location of the apparatus is determined within the region of the next hole.

* * * * *